(12) United States Patent
Okuyama et al.

(10) Patent No.: US 9,793,550 B2
(45) Date of Patent: Oct. 17, 2017

(54) GAS DIFFUSION LAYER FOR FUEL CELL

(75) Inventors: Yozo Okuyama, Yokosuka (JP);
Shigemasa Kuwata, Yokohama (JP);
Kazufumi Kodama, Zushi (JP)

(73) Assignee: NISSAN MOTOR CO., LTD.,
Yokohama-shi (JP)

( * ) Notice: Subject to any disclaimer, the term of this patent is extended or adjusted under 35 U.S.C. 154(b) by 583 days.

(21) Appl. No.: 14/126,668

(22) PCT Filed: May 31, 2012

(86) PCT No.: PCT/JP2012/064157
§ 371 (c)(1),
(2), (4) Date: Dec. 16, 2013

(87) PCT Pub. No.: WO2012/172994
PCT Pub. Date: Dec. 20, 2012

(65) Prior Publication Data
US 2014/0134516 A1    May 15, 2014

(30) Foreign Application Priority Data

Jun. 17, 2011 (JP) ................................ 2011-135075
Apr. 19, 2012 (JP) ................................ 2012-095504

(51) Int. Cl.
*H01M 4/86* (2006.01)
*H01M 8/0234* (2016.01)
(Continued)

(52) U.S. Cl.
CPC ....... *H01M 4/8605* (2013.01); *H01M 4/8642* (2013.01); *H01M 8/0234* (2013.01);
(Continued)

(58) Field of Classification Search
None
See application file for complete search history.

(56) References Cited

U.S. PATENT DOCUMENTS 7,232,627 B2    6/2007 Fukuda et al.
2003/0157397 A1*  8/2003 Barton ................ H01M 4/8605
429/481

(Continued)

FOREIGN PATENT DOCUMENTS

JP    2002-280004 A    9/2002
JP      3778506 B2    5/2006
(Continued)

*Primary Examiner* — Sarah A Slifka
*Assistant Examiner* — Haroon S Sheikh
(74) *Attorney, Agent, or Firm* — Foley & Lardner LLP

(57) ABSTRACT

A gas diffusion layer (30) for a fuel cell includes: a gas diffusion layer substrate (31); and a microporous layer (32) containing a granular carbon material and scale-like graphite and formed on the gas diffusion layer substrate (31). The microporous layer (32) includes a concentrated region (32a) of the scale-like graphite that is formed into a belt-like shape extending in a direction approximately parallel to a junction surface (31a) between the microporous layer (32) and the gas diffusion layer substrate (31). Accordingly, both resistance to dry-out and resistance to flooding, which are generally in a trade-off relationship, in the gas diffusion layer can be ensured so as to contribute to an increase in performance of a polymer electrolyte fuel cell.

7 Claims, 11 Drawing Sheets

(51) Int. Cl.
*H01M 8/0243* (2016.01)
*H01M 8/0245* (2016.01)
*H01M 8/1004* (2016.01)
*H01M 8/1018* (2016.01)

(52) U.S. Cl.
CPC ....... *H01M 8/0243* (2013.01); *H01M 8/0245* (2013.01); *H01M 8/1004* (2013.01); *H01M 2008/1095* (2013.01)

(56) References Cited

U.S. PATENT DOCUMENTS

| | | | | |
|---|---|---|---|---|
| 2006/0105159 | A1* | 5/2006 | O'Hara | H01M 8/0234 428/318.6 |
| 2006/0257641 | A1* | 11/2006 | Cho | H01M 4/8605 428/307.3 |
| 2008/0299430 | A1* | 12/2008 | Ichikawa | H01M 4/8605 429/483 |

FOREIGN PATENT DOCUMENTS

| | | | |
|---|---|---|---|
| JP | 2007-214112 A | | 8/2007 |
| JP | 2008-59917 A | | 3/2008 |
| JP | 2008059917 A | * | 3/2008 |
| WO | WO 2011/074327 A1 | | 6/2011 |

* cited by examiner

FIG. 3
(a)
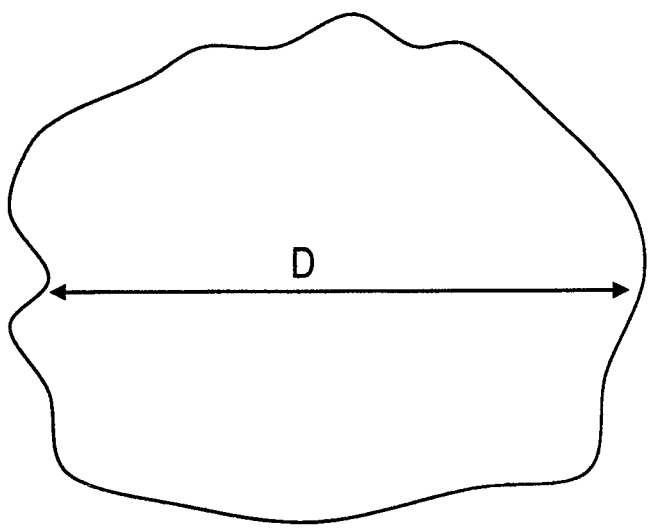
(b)
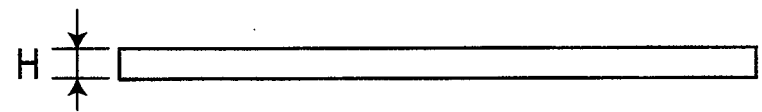

FIG. 4
(a)
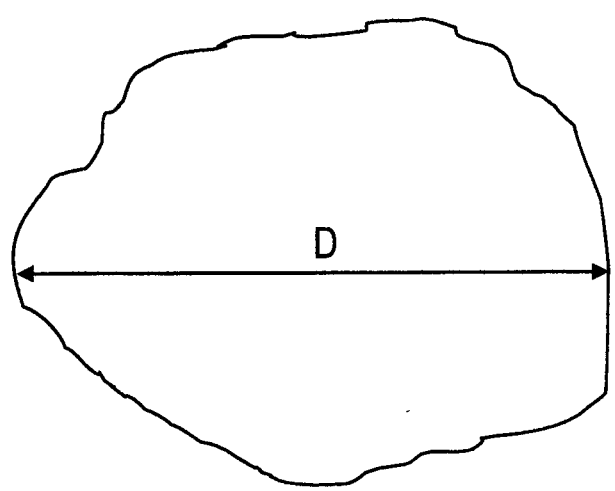
(b)
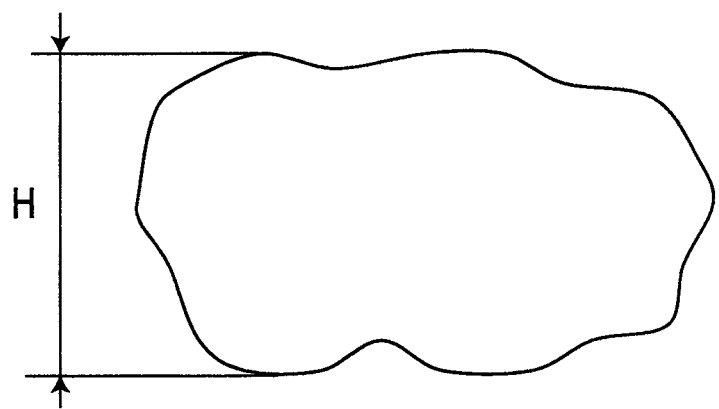

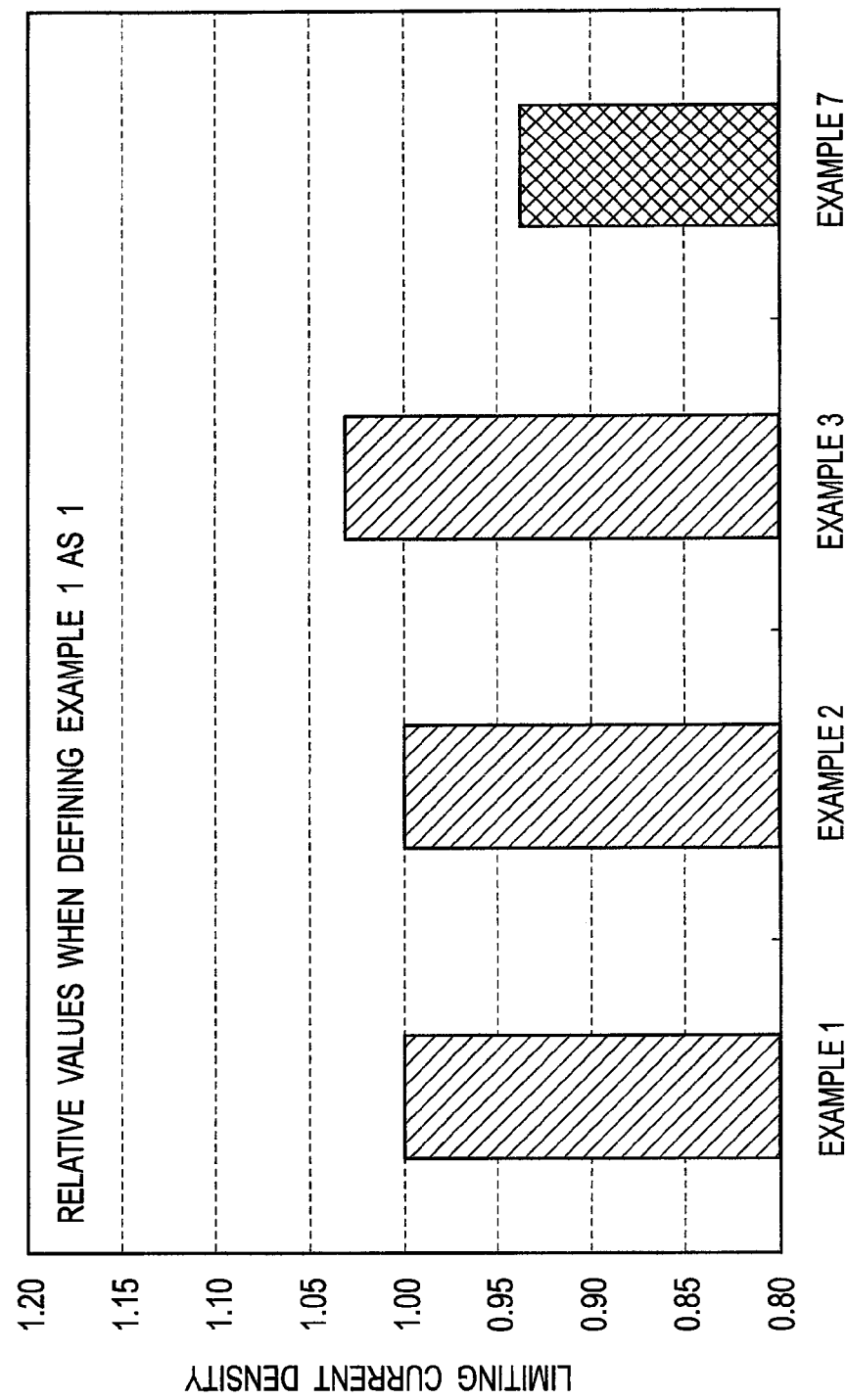

GAS DIFFUSION LAYER FOR FUEL CELL

TECHNICAL FIELD

The present invention relates to a gas diffusion layer including a microporous layer and used for a polymer electrolyte fuel cell (PEFC), and a membrane electrode assembly for a fuel cell including the gas diffusion layer.

BACKGROUND ART

Polymer electrolyte fuel cells using solid polymer electrolyte membranes having proton conductivity operate at a lower temperature compared with other fuel cells, such as solid oxide fuel cells and molten carbonate fuel cells. Therefore, the polymer electrolyte fuel cells are receiving increased attention as a driving power source for use in moving bodies such as vehicles and have already been put to practical use.

Gas diffusion electrodes used in such polymer electrolyte fuel cells include electrode catalyst layers containing catalyst-supporting carbon fine particles covered with ion exchange resin (a polymer electrolyte) identical to, or different from, a polymer electrolyte membrane. The gas diffusion electrodes further include gas diffusion layers that supply reactant gas to the catalyst layers and collects charges generated in the catalyst layers. A membrane electrode assembly is formed in a manner such that the gas diffusion electrodes are assembled by bringing the catalyst layers into contact with the polymer electrolyte membrane. Plural membrane electrode assemblies are stacked on top of each other via separators having gas passages, so as to compose a polymer electrolyte fuel cell.

For example, Patent Literature 1 discloses such a gas diffusion electrode for a polymer electrolyte fuel cell in which a water-repellent layer is formed on a substrate formed of carbon paper, and a water-holding layer is formed between the water-repellent layer and an electrode catalyst layer. Here, the water-repellent layer contains Teflon (registered trademark) and carbon black, and the water-holding layer contains carbon black, crystalline carbon fiber (VGCF), and an ionomer.

CITATION LIST

Patent Literature

Patent Literature 1: Japanese Patent No. 3778506

SUMMARY OF INVENTION

In a polymer electrolyte fuel cell, a state in which power generation cannot be continued because of a shortage of water necessary for proton conduction in an electrolyte membrane, is called a dry-out phenomenon. As measures for increasing resistance to dry-out, an electrolyte membrane capable of immediately transferring water generated in a cathode to an anode may be used, or water drained from a membrane electrode assembly may be reduced. However, in the latter case, the resistance to dry-out generally has a trade-off relationship with resistance to flooding.

In contrast, a state in which power generation cannot be continued because water generated in the cathode remains in a catalyst layer, a gas diffusion layer, a separator and the like, so that oxygen is hardly diffused in the cathode catalyst layer, is called a flooding phenomenon. As measures for increasing resistance to flooding, an electrolyte membrane capable of immediately transferring the water generated in the cathode to the anode may be used, or water drained from the membrane electrode assembly may be increased. However, in the latter case, the resistance to flooding generally has a trade-off relationship with the resistance to dry-out.

In order to deal with such a problem, Patent Literature 1 discloses that an intermediate layer (a water-holding layer) containing a hydrophilic ionomer is provided in a fuel cell so as to improve resistance to dry-out. The fuel cell of Patent Literature 1 operates normally at a current density of approximately 1 A/cm². However, the fuel cell cannot avoid a decrease in performance because of flooding at a high current density of, for example, approximately 2 A/cm².

The present invention has been accomplished in view of the conventional problem. An object of the present invention is to provide a gas diffusion layer for a fuel cell capable of concurrently ensuring resistance to dry-out and resistance to flooding, which are generally in a trade-off relationship, so as to contribute to an increase in performance of a polymer electrolyte fuel cell. Another object of the present invention is to provide a membrane electrode assembly for a fuel cell using such a gas diffusion layer.

A gas diffusion layer for a fuel cell according to an aspect of the present invention includes: a gas diffusion layer substrate; and a microporous layer containing a granular carbon material and scale-like graphite and formed on the gas diffusion layer substrate. The microporous layer includes a concentrated region of the scale-like graphite that is formed into a belt-like shape extending in a direction approximately parallel to a junction surface between the microporous layer and the gas diffusion layer substrate.

BRIEF DESCRIPTION OF DRAWINGS

FIG. 3 is a schematic view showing a configuration of scale-like graphite contained in a second microporous layer composing a microporous layer in the gas diffusion layer. FIG. 3(a) is a plan view of the scale-like graphite, and FIG. 3(b) is a side view of the scale-like graphite.

FIG. 4 is a schematic view showing a configuration of granular graphite contained in a first microporous layer composing the microporous layer in the gas diffusion layer. FIG. 4(a) is a plan view of the granular graphite, and FIG. 4(b) is a side view of the granular graphite.

FIG. 14 is a graph showing a limiting current density of a cell obtained in each of Examples under wet conditions.

DESCRIPTION OF EMBODIMENTS

A gas diffusion layer according to the present embodiment, and each material and a production method thereof will be explained in detail below. Note that the gas diffusion layer may be hereinafter abbreviated to "GDL" according to circumstances.

[Gas diffusion layer]

The gas diffusion layer for a fuel cell according to the present embodiment includes a gas diffusion layer substrate, and a microporous layer containing a granular carbon material and scale-like (scaly) graphite and formed on the gas diffusion layer substrate. The microporous layer includes a concentrated region of the scale-like graphite, which is formed into a belt-like shape extending in the direction approximately parallel to the junction surface between the microporous layer and the gas diffusion layer substrate. The gas diffusion layer is stacked on each surface of an electrolyte membrane with a catalyst layer interposed therebetween, so as to form a membrane electrode assembly. Hereinafter, the gas diffusion layer substrate may be abbreviated to "GDL substrate", the microporous layer may be abbreviated to "MPL", and the membrane electrode assembly may be abbreviated to "MEA" according to circumstances.

Figure 1:
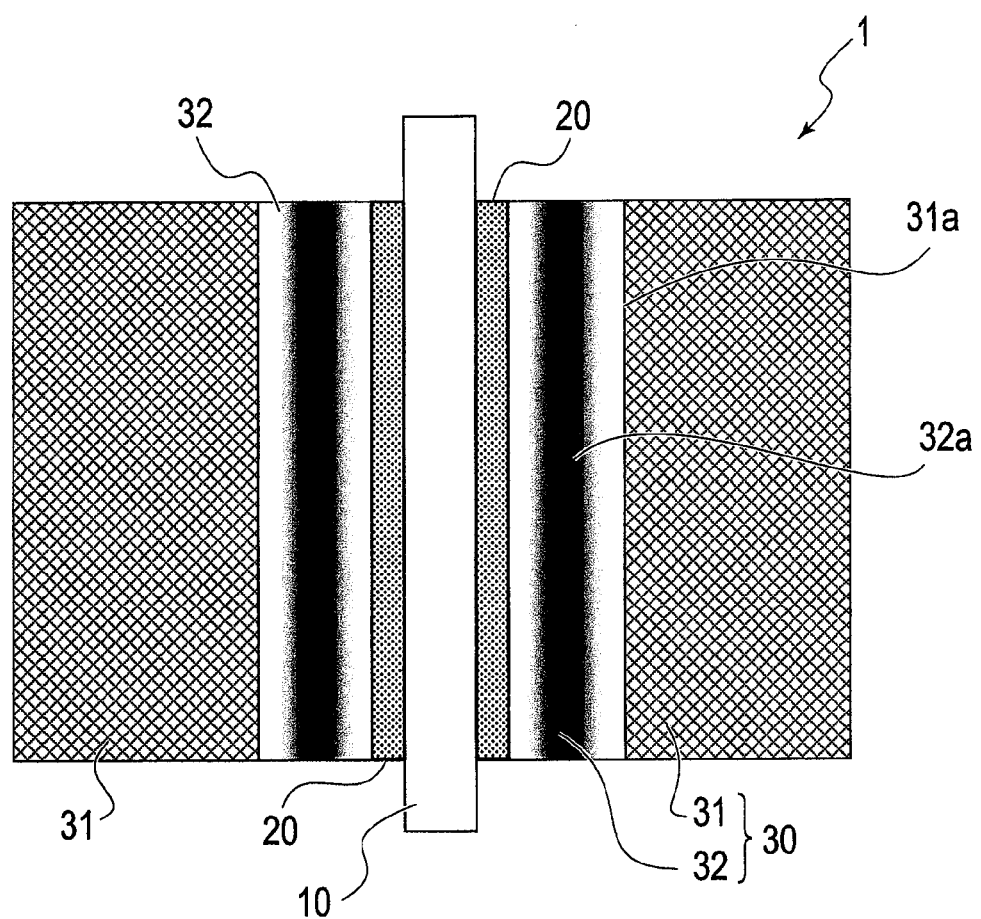
FIG. 1 is a schematic cross-sectional view showing a membrane electrode assembly using a gas diffusion layer according to an embodiment of the present invention.

FIG. 1 shows an example of the membrane electrode assembly using the gas diffusion layer according to the present embodiment. The membrane electrode assembly 1 shown in FIG. 1 includes an electrolyte membrane 10 interposed between an anode and a cathode, the anode and the cathode each including a catalyst layer 20. A gas diffusion layer 30 that includes a gas diffusion layer substrate 31 and a microporous layer 32 containing a granular carbon material and scale-like graphite and formed on the gas diffusion layer substrate 31, is arranged on one side of each of the catalyst layers 20 provided in both electrodes.

The microporous layer 32 contains the scale-like graphite and a granular carbon material having a grain shape as described below and includes inside thereof a region 32a where the scale-like graphite is concentrated. The concentrated region 32a is formed in a belt-like shape or in a striped pattern extending in the direction parallel to the junction surface 31a between the gas diffusion layer substrate 31 and the microporous layer 32. Namely, the concentrated region 32a is formed in a belt-like shape or in a striped pattern extending in the direction parallel to the plane direction of the catalyst layer 20 and the electrolyte membrane 10. This concentrated region 32a of the scale-like graphite distributed along the electrolyte membrane can reduce contact resistance between the catalyst layer 20 and the microporous layer 32 and between the gas diffusion layer substrate 31 and the microporous layer 32. The presence of the concentrated region 32a also contributes to keeping water held in the electrolyte membrane 10 and the catalyst layer 20.

The concentrated region 32a of the scale-like graphite in the microporous layer 32 is preferably present in greater amount on the opposite side from the gas diffusion layer substrate 31, namely on the catalyst layer 20 side. In particular, the surface 32b of the microporous layer 32 located on the opposite side of the junction surface 31a between the gas diffusion layer substrate 31 and the microporous layer 32, is in contact with the catalyst layer 20 composing the membrane electrode assembly 1. The content of the scale-like graphite in the microporous layer 32 is preferably higher towards the contact surface 32b between the microporous layer 32 and the catalyst layer 20 than towards the junction surface 31a between the gas diffusion layer substrate 31 and the microporous layer 32. When the region 32a where the scale-like graphite is concentrated is present in greater amount adjacent to the contact surface 32b, water is prevented from moving from the electrolyte membrane 10 to the gas diffusion layer substrate 31. In other words, dry-out in the electrolyte membrane 10 is prevented due to the concentrated region 32a. As a result, a decrease in proton conductivity in the electrolyte membrane 10 can be suppressed.

Figure 2:
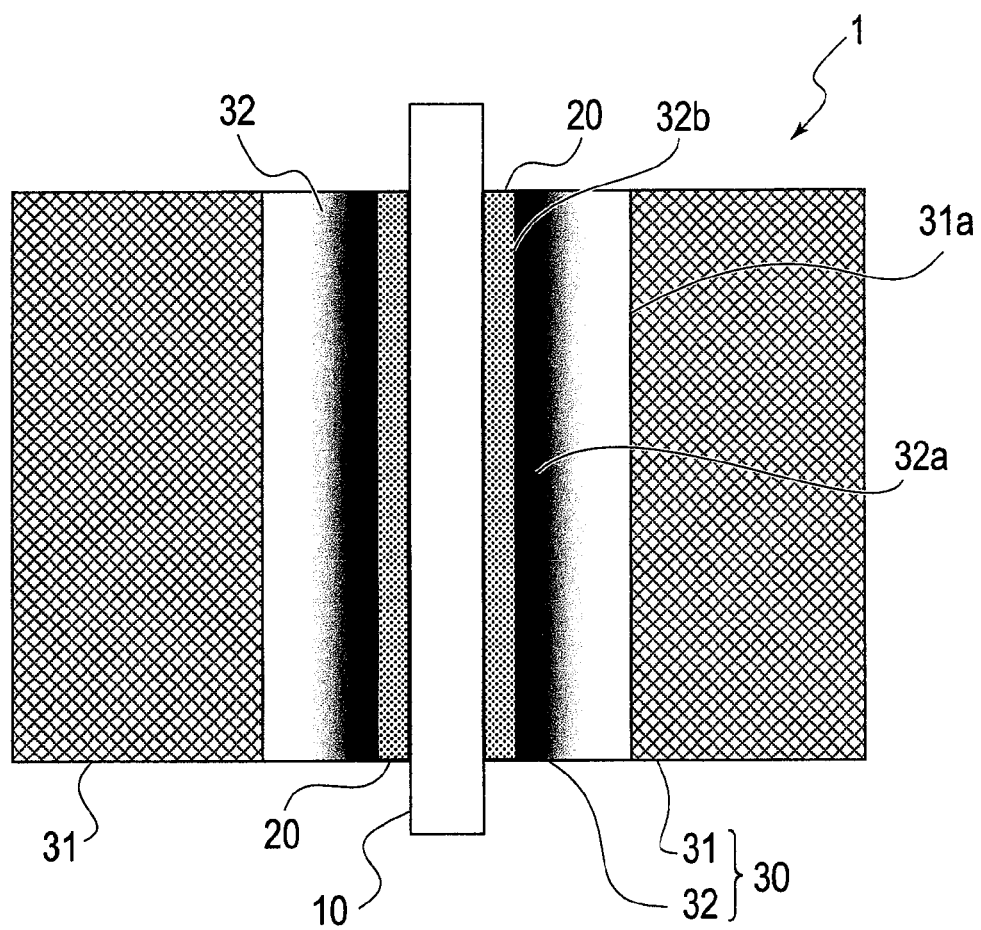
FIG. 2 is a schematic cross-sectional view showing a membrane electrode assembly using a gas diffusion layer according to another embodiment of the present invention.

As shown in FIG. 2, the content of the scale-like graphite in the microporous layer 32 preferably gradually decreases from the contact surface 32b between the microporous layer 32 and the catalyst layer 20 towards the junction surface 31a between the microporous layer 32 and the gas diffusion layer substrate 31 in the stacking direction of the gas diffusion layer substrate 31 and the microporous layer 32. The gradient of the concentration of the scale-like graphite that gradually decreases from the catalyst layer 20 towards the gas diffusion layer substrate 31, can keep the water held in the electrolyte membrane 10 and the catalyst layer 20.

The following is an explanation of materials contained in each membrane electrode assembly 1.

The electrolyte membrane 10 is not particularly limited, and may be a commonly-used perfluorosulfonic acid electrolyte membrane or a hydrocarbon electrolyte membrane. Examples of the perfluorosulfonic acid electrolyte include Nafion (registered trademark, made by DuPont Corporation), Aciplex (registered trademark, made by Asahi Kasei Corporation), and Flemion (registered trademark, made by Asahi Glass Co., Ltd.). Examples of the hydrocarbon electrolyte include hydrocarbon resin including sulfonic acid groups, a material in which an inorganic acid such as phosphoric acid is doped into a hydrocarbon polymer compound, an organic/inorganic hybrid polymer of which part is substituted by functional groups of a proton conductor, and a proton conductor in which a polymer matrix is impregnated with a phosphoric acid solution or a sulfuric acid solution. In view of resistance to oxidation, low gas permeability, ease of production, and low cost, the hydrocarbon polymer electrolyte including sulfonic acid groups is preferable. Preferable examples of the hydrocarbon electrolyte used in the present embodiment include sulfonated polyaryl ether sulfone (S-PES), polybenzimidazole (PBI), polybenzoxazole (PBO), sulfonated polyphenoxybenzoyl phenylene (S-PPBP), and polyether ether ketone (S-PEEK).

The catalyst layer 20 is not particularly limited, and a commonly-used material may be applicable. In particular, a material obtained in a manner as to mix the perfluorosulfonic acid electrolyte or the hydrocarbon electrolyte into carbon that supports platinum or a platinum alloy, may be used for the catalyst layer 20. A water-repellent agent or a pore forming agent may be further added to the catalyst layer 20 as necessary. Examples of the carbon include carbon black (such as oil furnace black, acetylene black, ketjen black, thermal black, and channel black), graphite, and activated carbon.

The gas diffusion layer substrate 31 in the gas diffusion layer 30 is not particularly limited, and a material formed of carbon fiber such as carbon paper, carbon cloth, or non-woven fabric may be used. The gas diffusion layer substrate 31 may also be a substrate obtained in a manner such that the material formed of carbon fiber is impregnated with a water-repellent agent such as polytetrafluoroethylene (PTFE). Note that the gas diffusion layer substrate may be subjected to hydrophilic treatment, instead of water-repellent treatment, depending on the water-draining performance of the membrane electrode assembly using the gas diffusion layer and the surface condition of the separator. In addition, the gas diffusion layer substrate may be impregnated with graphite, carbon black, or a mixture thereof.

The microporous layer 32 formed on the gas diffusion layer 30 contains the scale-like graphite as described above and further contains a granular carbon material and a binder. The binder is preferably capable of ensuring strength of the microporous layer 32 by binding each carbon material and concurrently functioning as a water-repellent agent. For example, polytetrafluoroethylene (PTFE) may be mainly used as such a binder. Alternatively, a tetrafluoroethylene-hexafluoropropylene copolymer (FEP) or a tetrafluoroethylene-perfluoroalkyl vinyl ether copolymer (PFA) may also be used as the binder.

The scale-like graphite has high crystallinity and has a scale-like shape having a high aspect ratio as shown in FIG. 3(*a*) and FIG. 3(*b*). This flat scale-like graphite contributes to an improvement in gas permeability in the thickness direction and in the plane direction of the microporous layer 32, and a reduction in electrical resistance in the plane direction, in other words, contributes to an improvement in electrical conductivity. Here, the scale-like graphite according to the present embodiment represents graphite having a thickness H in the range from 0.05 µm to 1 µm and an aspect ratio approximately in the range from 10 to 1000. The aspect ratio of the scale-like graphite represents a ratio of a mean planar diameter D to the thickness H of the scale-like graphite (mean planar diameter D/thickness H). The mean planar diameter of the scale-like graphite is a mean diameter in the flat plane direction observed by a laser diffraction/scattering method. The thickness H of the scale-like graphite may be observed with a scanning electron microscope (SEM) or a transmission electron microscope (TEM). Particularly, the mean planar diameter is preferably in the range from 5 µm to 50 µm. The use of such scale-like graphite can improve electrical conductivity and gas permeability in the microporous layer 32.

As for the granular carbon material contained in the microporous layer 32, carbon particles having an aspect ratio (mean planar diameter D/thickness H) approximately in the range from 1 to 3 may be used. A mean particle diameter of the granular carbon material is preferably in the range from 100 nm to 10 µm. Therefore, for example, granular graphite or carbon black may be used as the granular carbon material.

The granular graphite as the granular carbon material has high crystallinity as in the case of the scale-like graphite, but is in a granular state having a low aspect ratio (mean planar diameter D/thickness H) as shown in FIG. 4(*a*) and FIG. 4(*b*). Here, the granular graphite according to the present embodiment represents graphite with the aspect ratio approximately in the range from 1 to 3. A mean particle diameter of the granular graphite is preferably in the range from 1 µm to 10 µm. The mean planar diameter D and the thickness H of the granular graphite may be observed in the same manner as the scale-like graphite.

The carbon black as the granular carbon material includes carbon fine particles. Examples of the carbon black include oil furnace black, acetylene black, ketjen black, thermal black, and channel black. Among these examples of the carbon black, acetylene black is preferably used in view of high dispersibility and improvement in productivity. A mean particle diameter of the carbon black is preferably smaller than or equal to 1 µm, more preferably in the range from 10 nm to 100 nm.

In the gas diffusion layer according to the present embodiment, the microporous layer 32 may also have a multi-layer structure, in addition to the structures shown in FIG. 1 and FIG. 2. Hereinafter, the gas diffusion layer 30 including the microporous layer 32 having a double-layer structure composed of a first microporous layer 33 and a second microporous layer 34, is explained.

Figure 5:
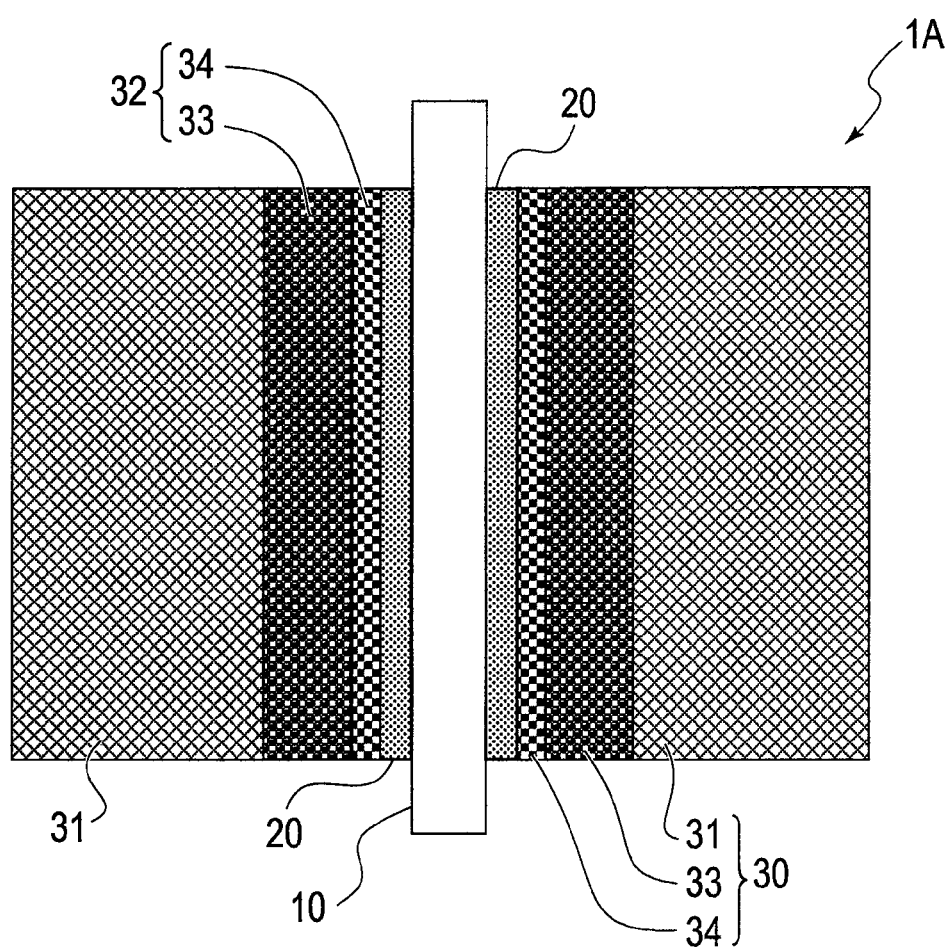
FIG. 5 is a schematic cross-sectional view showing a membrane electrode assembly using a gas diffusion layer according to still another embodiment of the present invention.

FIG. 5 shows an example in which the gas diffusion layer 30 including the microporous layer 32 having a double-layer structure is used in the membrane electrode assembly. The membrane electrode assembly 1A shown in FIG. 5 has a configuration in which the catalyst layers 20 are arranged on both sides of the electrolyte membrane 10, and the gas diffusion layers 30 are arranged in a manner as to be in contact with the respective catalyst layers 20. The gas diffusion layers 30 each include the microporous layer 32 formed on the gas diffusion layer substrate 31 and having a double-layer structure composed of the first microporous layer 33 and the second microporous layer 34.

The membrane electrode assembly 1A shown in FIG. 5 has substantially the same structure including the same materials as the membrane electrode assemblies shown in FIG. 1 and FIG. 2 except that the microporous layer 32 is composed of two layers, and overlapping explanations thereof are not repeated. The positional relationship between the first microporous layer 33 and the second microporous layer 34 is not particularly limited. However, as shown in FIG. 5, the first microporous layer 33 is preferably located on the gas diffusion layer substrate 31 side, and the second microporous layer 34 is preferably located on the catalyst layer 20 side. Hereinafter, the microporous layer 32 is explained based on the configuration shown in FIG. 5.

The second microporous layer 34 composing the gas diffusion layer 30 contains a binder in addition to the scale-like graphite as an essential carbon material. In view of further improving electrical conductivity and gas permeability, the second microporous layer 34 further contains a carbon material serving as an electrically conductive path material or a spacer material. The electrically conductive path material is a material interposed between pieces of the scale-like graphite to improve electrical conductivity therebetween. The spacer material is a material interposed between pieces of the scale-like graphite to extend the distance therebetween and thereby improve permeability of reactant gas (fuel gas and oxidant gas). Particular examples of the carbon material serving as the electrically conductive path material or the spacer material include the carbon black and the granular graphite described above.

In the second microporous layer 34, plural pieces of the flat scale-like graphite Gf are arranged approximately in parallel with each other in the plane direction of the second microporous layer 34, so as to concurrently ensure gas permeability in the thickness and plane directions and electrical conductivity in the plane direction in the second microporous layer 34. In view of this, the content of the scale-like graphite Gf in the second microporous layer 34 is preferably 60% by mass or greater, particularly preferably 70% by mass or greater. The content of the binder in the second microporous layer 34 is not particularly limited as long as it is sufficient to bind the pieces of the scale-like graphite Gf to each other, but it may be in the range from 1% by mass to 30% by mass.

The thickness of the second microporous layer 34 is preferably 10 μm or less. The second microporous layer 34 with the thickness of 10 μm or less can sufficiently ensure electrical conductivity, gas permeability, and water-draining performance. The second microporous layer 34 with such a thickness can also prevent an increase in thickness of the gas diffusion layer, thereby miniaturizing the entire fuel cell. The lower limit of the thickness of the second microporous layer 34 is not particularly limited, but may be, for example, 1 μm.

The scale-like graphite contained in the second microporous layer 34 may employ the shape and the dimension shown in FIG. 3 and may function in a manner similar to the case described above. The mean planar diameter of the scale-like graphite is preferably in the range from 5 μm to 50 μm as described above. Such scale-like graphite can improve electrical conductivity and gas permeability with no influence on the thickness of the microporous layer. The scale-like graphite having a mean planar diameter of 5 μm or larger can contribute to an improvement in gas permeability. When the mean planar diameter of the scale-like graphite is 50 μm or smaller, and the electrically conductive path material is mixed into and interposed between the pieces of the scale-like graphite, electrical conductivity therebetween can be ensured sufficiently.

As described above, the large-diameter scale-like graphite having a particle diameter (mean planar diameter) in the range from 5 μm to 50 μm and the small-diameter scale-like graphite having a particle diameter of smaller than 5 μm may be combined together. The small-diameter scale-like graphite functions as an electrically conductive path material so as to improve electrical conductivity and reduce thermal resistance, namely improve thermal conductivity, thereby improving performance in a low wet state.

Examples of the carbon black contained in the second microporous layer 34 include oil furnace black, acetylene black, ketjen black, thermal black, and channel black, as in the case described above. Among these examples of the carbon black, acetylene black is preferably used in view of high dispersibility and improvement in productivity.

When the second microporous layer 34 contains acetylene black, the content of the acetylene black is preferably in the range from 5% by mass to 25% by mass in view of an improvement in gas permeability and electrical conductivity. When the content of the acetylene black is 5% by mass or greater, the contact surface between the acetylene black and the scale-like graphite increases, so that the electrical resistance between the acetylene black and the scale-like graphite decreases. When the content of the acetylene black is 25% by mass or less, pores between the pieces of the scale-like graphite are prevented from being filled with the acetylene black so as to keep high reactant gas permeability.

The granular graphite contained in the second microporous layer 34 may employ the shape and the dimension shown in FIG. 4. As in the case described above, the aspect ratio of the granular graphite may be approximately in the range from 1 to 3, and the mean particle diameter may be in the range from 1 μm to 10 μm. The granular graphite having a mean particle diameter of 1 μm or larger can contribute to an improvement in gas permeability. When the mean particle diameter of the scale-like graphite is 10 μm or smaller, and the granular graphite is interposed between the pieces of the scale-like graphite, electrical conductivity therebetween can be ensured sufficiently. Further, when the mean particle diameter of the granular graphite is 10 μm or smaller, an increase in thickness of the second microporous layer 34 can be prevented.

As described above, polytetrafluoroethylene (PTFE) may be preferable to be mainly used as the binder contained in the second microporous layer 34. Alternatively, a tetrafluoroethylene-hexafluoropropylene copolymer (FEP) or a tetrafluoroethylene-perfluoroalkyl vinyl ether copolymer (PFA) may also be used.

FIG. 6 to FIG. 9 show structural examples of the second microporous layer 34 containing the scale-like graphite described above and other carbon materials mixed therewith.

Figure 6:
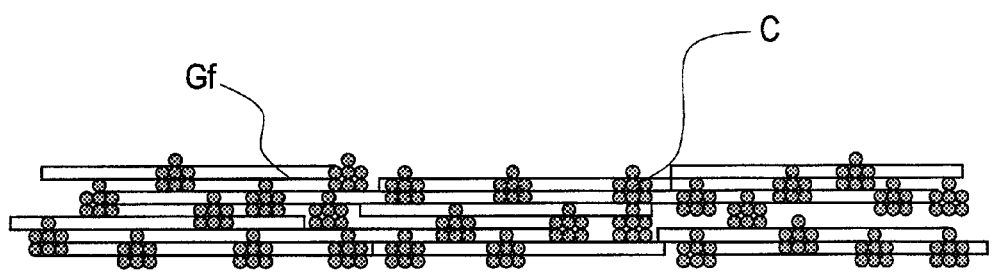
FIG. 6 is a schematic cross-sectional view showing an example of the second microporous layer composing the microporous layer in the gas diffusion layer, in which large-diameter scale-like graphite and carbon black are used.

FIG. 6 shows an example in which the second microporous layer 34 contains scale-like graphite, carbon black, and a binder (not shown in the figure). In this second microporous layer 34, pieces of the flat scale-like graphite Gf are arranged approximately in parallel with each other in the plane direction of the second microporous layer 34, so as to ensure gas permeability in the thickness and plane directions and electrical conductivity in the plane direction in the second microporous layer 34. The carbon black C interposed between the pieces of the scale-like graphite Gf functions as an electrically conductive path material to improve electrical conductivity in the thickness direction of the second microporous layer 34.

Figure 7:
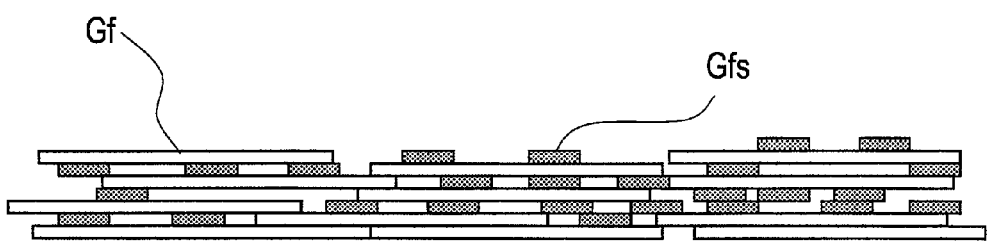
FIG. 7 is a schematic cross-sectional view showing an example of a case where scale-like graphite and small-diameter scale-like graphite are used in the second microporous layer.

FIG. 7 shows an example in which both large-diameter scale-like graphite and small-diameter scale-like graphite are used as the carbon material, and a binder (not shown in the figurer) is mixed therewith. In this second microporous layer 34, the small-diameter scale-like graphite Gfs is interposed between pieces of the large-diameter scale-like graphite Gf so as to function as an electrically conductive path material as in the case of the carbon black of FIG. 6 and improve electrical conductivity in the thickness direction of the second microporous layer 34.

Figure 8:
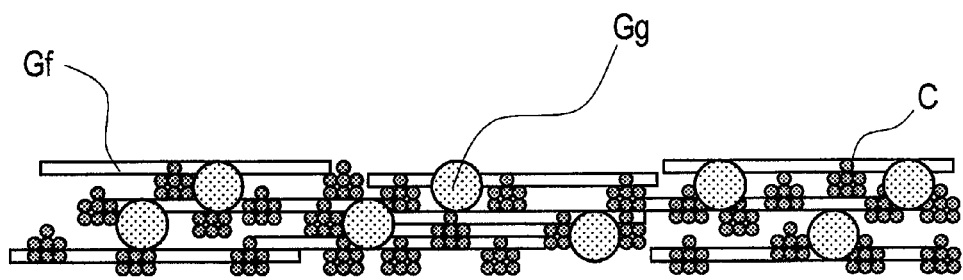
FIG. 8 is a schematic cross-sectional view showing an example of a case where scale-like graphite, carbon black, and granular graphite are used in the second microporous layer.

FIG. 8 shows an example in which scale-like graphite, carbon black and granular graphite are used as the carbon material, and a binder (not shown in the figure) is mixed therewith. As in the case of FIG. 6, carbon black C is interposed between pieces of the scale-like graphite Gf so as to function as an electrically conductive path material to improve electrical conductivity in the thickness direction of the second microporous layer 34. In addition, granular graphite Gg functions as a spacer material to improve gas permeability in the thickness direction and in the plane direction of the second microporous layer 34.

Figure 9:
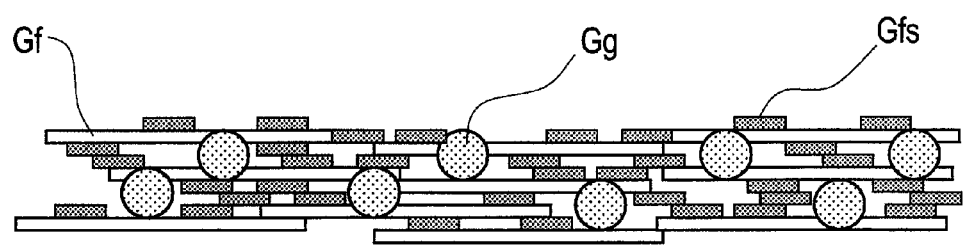
FIG. 9 is a schematic cross-sectional view showing an example of a case where scale-like graphite, small-diameter scale-like graphite, and granular graphite are used in the second microporous layer.

FIG. 9 shows an example in which large-diameter scale-like graphite Gf, small-diameter scale-like graphite Gfs and granular graphite Gg are used together, and a binder (not shown in the figure) is mixed therewith. As in the case of the above-described examples, the large-diameter scale-like graphite Gf ensures gas permeability in the thickness direction and gas permeability and electrical conductivity in the plane direction, the small-diameter scale-like graphite Gfs functions as an electrically conductive path material, and the granular graphite Gg functions as a spacer material.

It should be noted that the structural examples of the second microporous layer shown in FIG. 6 to FIG. 9 are merely representative examples. For example, the small-diameter scale-like graphite may be added to the second microporous layer shown in FIG. 6, the granular graphite may be further added thereto, or other combinations may be possible.

The first microporous layer 33 formed on the gas diffusion layer substrate 31 prior to the second microporous layer 34 contains a granular carbon material. The first microporous layer 33 also contains a binder to ensure strength of the MPL by binding gains of the granular carbon material. The thickness of the first microporous layer 33 is preferably in the range from 10 μm to 100 μm.

The first microporous layer 33 containing the granular carbon material having an aspect ratio in the range from 1 to 3, can ensure electrical conductivity in the thickness direction and in the plane direction of the first microporous layer 33. In view of this, the content of the granular carbon material in the first microporous layer 33 is preferably 50% by mass or greater, particularly preferably 60% by mass or greater. The content of the binder in the first microporous layer 33 is not particularly limited as long as it is sufficient to bind grains of the granular carbon material, but it may be, for example, in the range from 10% by mass to 40% by mass.

Examples of the granular carbon material include the carbon black and the granular graphite described above. The binder may also be the materials described above. Note that scale-like graphite not having a grain shape is not contained in the first microporous layer 33.

A mean particle diameter of the carbon black is preferably in the range from 10 nm to 100 nm. As in the case of the second microporous layer 34, examples of the carbon black include oil furnace black, acetylene black, ketjen black, thermal black, and channel black. The granular graphite having an aspect ratio in the range from 1 to 3 and a mean particle diameter in the range from 1 μm to 10 μm, may be preferably used.

Figure 10:
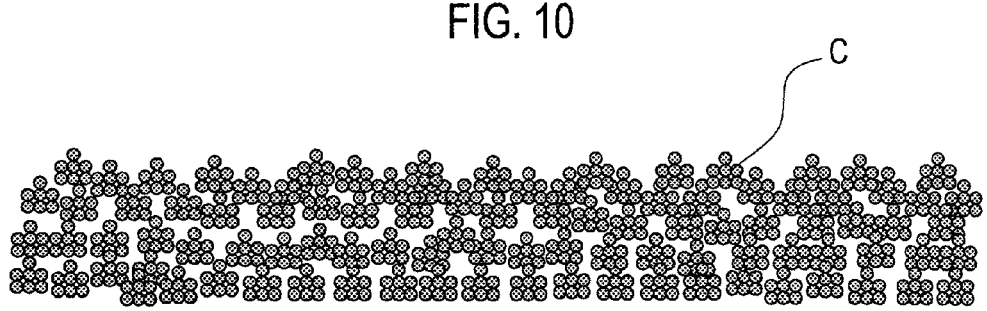
FIG. 10 is a schematic cross-sectional view showing an example of the first microporous layer composing the microporous layer in the gas diffusion layer, in which a granular carbon material containing carbon black is used.
Figure 11:
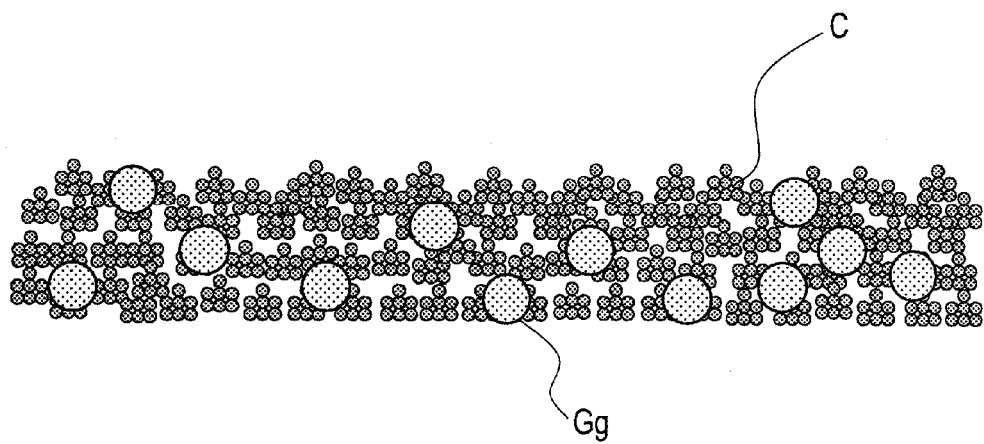
FIG. 11 is a schematic cross-sectional view showing an example of a case where carbon black and a granular carbon material containing granular graphite are used in the first microporous layer.

FIG. 10 and FIG. 11 show schematic structural examples of the first microporous layer 33 in which the granular carbon materials are combined together.

FIG. 10 shows an example containing carbon black C and a binder (not shown in the figure). FIG. 11 shows an example in which carbon black C and granular graphite Gg are used together, and a binder (not shown in the figure) is mixed therewith.

[Method for Manufacturing Gas Diffusion Layer]

In the method for manufacturing the gas diffusion layer according to the present embodiment, the granular carbon material and the binder described above are first mixed together with a solvent so as to prepare ink for forming the first microporous layer. Here, a conventionally-known surfactant or thickener may be mixed with the ink for forming the first microporous layer as necessary.

Next, the scale-like graphite and the binder are mixed with a solvent so as to prepare ink for forming the second microporous layer. Here, the carbon black or the granular graphite described above that functions as an electrically conductive path material or a spacer material may be mixed with the ink for the second microporous layer as necessary. As in the case of the ink for forming the first microporous layer, a conventionally-known surfactant or thickener may be mixed therewith as necessary.

Subsequently, the ink for forming the first microporous layer is applied to the gas diffusion layer substrate formed of, for example, water-repellent carbon paper and is then dried. The ink for forming the second microporous layer is applied to the dried first microporous layer and is dried and baked. Accordingly, the gas diffusion layer of the present embodiment can be obtained. Due to the process of applying the ink for forming the second microporous layer to the dried first microporous layer and drying it, part of the ink for forming the second microporous layer penetrates into pores of the first microporous layer. As a result, a structure shown in FIG. 2 having a gradient of the concentration of the scale-like graphite that gradually decreases from the surface 32b of the microporous layer 32 in contact with the catalyst layer 20 towards the surface 31a in contact with the gas diffusion layer substrate 31, can be obtained.

The solvent used for the preparation of the ink is not particularly limited, and examples thereof include water, and alcohol such as methanol, ethanol, 1-propanol (NPA), 2-propanol, ethylene glycol, and propylene glycol.

Alternatively, the gas diffusion layer may be obtained by the following method in addition to the wet application method described above. First, ink for forming the first microporous layer is applied to a heat-resistant holding sheet, and dried and baked, thereby preparing the first microporous layer. Subsequently, ink for the forming the second microporous layer is applied to another heat-resistant holding sheet, and dried and baked, thereby preparing the second microporous layer. The sheet-like first microporous layer and second microporous layer separately prepared are attached to the gas diffusion layer substrate, so as to manufacture the gas diffusion layer.

The manufacturing method by use of such a heat-resistant holding sheet can prevent the gas diffusion layer substrate from being clogged up because of ink penetration so as to improve gas permeability in the gas diffusion layer. The sheet-like first microporous layer and second microporous layer may each be a separated layer, or may have a combined layer structure in which the two layers are integrated together. The heat-resistant holding sheet used may be a film containing polyimide, polypropylene, polyethylene, polysulfone or polytetrafluoroethylene and having a thickness approximately in the range from 10 μm to 100 μm.

The gas diffusion layer 30 shown in FIG. 1 in which the concentrated region 32a of the scale-like graphite is present in the middle portion in the thickness direction of the microporous layer 32, may be prepared as follows. First, ink for forming the first microporous layer is applied to a heat-resistant sheet and dried, thereby preparing the first microporous layer. Next, ink for forming the second microporous layer is applied to the dried first microporous layer and dried and baked, thereby obtaining a stacked body of the first microporous layer and the second microporous layer. Subsequently, two stacked bodies are prepared and stacked on top of each other in a manner such that the respective second microporous layers face each other, thereby obtaining the microporous layer shown in FIG. 1. The microporous layer thus obtained is then attached to the gas diffusion layer substrate, so as to manufacture the gas diffusion layer.

In the method for manufacturing the membrane electrode assembly, first, the catalyst layers 20 are placed on both surfaces of the electrolyte membrane 10 to form a CCM (catalyst coated membrane). In this case, the catalyst layers 20 may be transferred to the surfaces of the electrolyte membrane 10 by hot pressing. Alternatively, slurry for forming the catalyst layer may be directly applied to the surfaces of the electrolyte membrane 10 and then dried. The gas diffusion layers manufactured as described above are attached to the CCM, so as to obtain the membrane electrode assembly.

The membrane electrode assembly shown in FIG. 5 may be manufactured by a method in which the gas diffusion layers 30 each including the first microporous layer 33 and the second microporous layer 34 formed on the gas diffusion layer substrate 31, are attached to the CCM. Alternatively, the catalyst layer 20 preliminarily applied to the second microporous layer side of the gas diffusion layer 30 may be attached to each side of the electrolyte membrane 10 by hot pressing. In such a case, the application condition of the catalyst layer or the attachment condition such as hot pressing varies depending on whether a perfluorosulfonic acid electrolyte or a hydrocarbon electrolyte is used as an electrolyte in the electrolyte membrane and the catalyst layer.

EXAMPLES

Hereinafter, the present invention will be explained in more detail with reference to examples; however, the scope of the present invention is not limited to these examples.

Example 1

Ink for forming a first microporous layer was prepared in which carbon black having a primary particle diameter of 40 nm and polytetrafluoroethylene (PTFE) as a binder were mixed in solid proportions of 60% by mass and 40% by mass respectively. The ink thus prepared was applied to a gas diffusion layer substrate formed of carbon paper having been subjected to water-repellent treatment with PTFE, and then dried naturally, thereby obtaining a first microporous layer. The thickness of the carbon paper was 150 μm. The carbon paper was subjected to water-repellent treatment in a manner such that the entire carbon paper was impregnated with 10% by mass of PTFE.

Subsequently, scale-like graphite, acetylene black, and PTFE were mixed in solid proportions of 83.125% by mass, 11.875% by mass, and 5% by mass respectively, so as to prepare ink for a second microporous layer. Here, the scale-like graphite has a mean planar diameter of 15 μm, a thickness of 0.1 μm, and a specific surface area of 6 $m^2/g$. The acetylene black has a primary particle diameter of 40 nm and a specific surface area of 37 $m^2/g$.

Subsequently, the ink for a second microporous layer was applied to the first microporous layer obtained as described above, dried at 80° C., and baked at 330° C. Accordingly, a gas diffusion layer was obtained in which the first microporous layer having a thickness of 50 μm and the second microporous layer having a thickness of 10 μm were formed on the gas diffusion layer substrate.

Further, a catalyst layer containing platinum-supporting carbon and a perfluorosulfonic acid electrolyte was formed on both surfaces of a perfluorosulfonic acid electrolyte membrane so as to prepare a CCM. The supporting amount of platinum in each catalyst layer was set to 0.05 $mg/cm^2$ in the anode-side catalyst layer and was set to 0.35 $mg/cm^2$ in the cathode-side catalyst layer. Subsequently, the CCM was interposed between the gas diffusion layers, so as to obtain a membrane electrode assembly of Example 1.

Example 2

Similar operations to those of Example 1 were repeated except that the scale-like graphite, the acetylene black, and the PTFE were mixed in the second microporous layer in solid proportions of 70% by mass, 10% by mass, and 20% by mass respectively, thereby obtaining a membrane electrode assembly of Example 2.

Example 3

Similar operations to those of Example 1 were repeated except that the scale-like graphite, the acetylene black, and the PTFE were mixed in the second microporous layer in solid proportions of 86.625% by mass, 12.375% by mass, and 1% by mass respectively, thereby obtaining a membrane electrode assembly of Example 3.

Example 4

In stead of the acetylene black contained in the second microporous layer, ketjen black having a primary particle diameter of 34 μm and a specific surface area of 1270 $m^2/g$ was used. The scale-like graphite, the ketjen black, and the PTFE were mixed in solid proportions of 89.0625% by mass, 5.9375% by mass, and 5% by mass respectively. Similar operations to those of Example 1 other than the preparation of the second microporous layer were repeated, thereby obtaining a membrane electrode assembly of Example 4.

Example 5

Granular graphite was added to the second microporous layer, and the scale-like graphite, the acetylene black, the granular graphite, and the PTFE were mixed in solid proportions of 71.125% by mass, 11.875% by mass, 11.875% by mass, and 5.125% by mass respectively. Similar operations to those of Example 1 other than the preparation of the second microporous layer were repeated, thereby obtaining a membrane electrode assembly of Example 5. Here, the granular graphite has a mean particle diameter of 2 μm and a specific surface area of 100 $m^2/g$.

Example 6

Similar operations to those of Example 1 were repeated except that the carbon black was not contained in the second microporous layer, and the scale-like graphite and the PTFE were mixed in solid proportions of 95% by mass and 5% by mass respectively, thereby obtaining a membrane electrode assembly of Example 6.

Example 7

Similar operations to those of Example 1 were repeated except that the thickness of the second microporous layer was set to 20 μm, thereby obtaining a membrane electrode assembly of Example 7.

Comparative Example 1

Similar operations to those of Example 1 were repeated except that a gas diffusion layer not including the second microporous layer but only including the first microporous layer was used, thereby obtaining a membrane electrode assembly of Comparative Example 1.

Table 1 summarizes specifications of the gas diffusion layer prepared in each of Examples 1 to 7 and Comparative Example 1 prepared as described above.

TABLE 1

| | First Microporous Layer | | Second Microporous Layer | | | | |
|---|---|---|---|---|---|---|---|
| | Granular Carbon Material | | Scale-like | Granular Carbon Material | | | |
| | Carbon Black (Mass %) | PTFE (Mass %) | Graphite (Mass %) | Carbon Black (Mass %) | Granular Graphite (Mass %) | PTFE (Mass %) | Thickness (μm) |
| Example 1 | 60 | 40 | 83.125 | 11.875 * | — | 5 | 10 |
| Example 2 | 60 | 40 | 70 | 10 * | — | 20 | 10 |
| Example 3 | 60 | 40 | 86.625 | 12.375 * | — | 1 | 10 |
| Example 4 | 60 | 40 | 89.0625 | 5.9375 ** | — | 5 | 10 |
| Example 5 | 60 | 40 | 71.125 | 11.875 * | 11.875 | 5.125 | 10 |
| Example 6 | 60 | 40 | 95 | — | — | 5 | 10 |
| Example 7 | 60 | 40 | 83.125 | 11.875 * | — | 5 | 20 |
| Comparative Example 1 | 60 | 40 | — | — | — | — | — |

* Acetylene Black
** Ketjen Black

[Measurement of Electrical Resistance of Gas Diffusion Layer in Thickness Direction]

For the measurement of electrical resistance, first, a sample was obtained in a manner such that the gas diffusion layer obtained in each of Examples 1 to 7 and Comparative Example 1 was cut out so as to have an area of 1.25 cm². Next, the sample of the gas diffusion layer was held between a metal separator having a contact area of 0.23 cm² on one side and gold leaf having a contact area of 1.25 cm² on the other side. Subsequently, electricity was supplied between the metal separator and the gold leaf while applying a load thereto so as to measure the electrical resistance of the gas diffusion layer. The metal separator was formed of stainless steel, and the flow path for reactant gas was a straight flow path.

Figure 12:
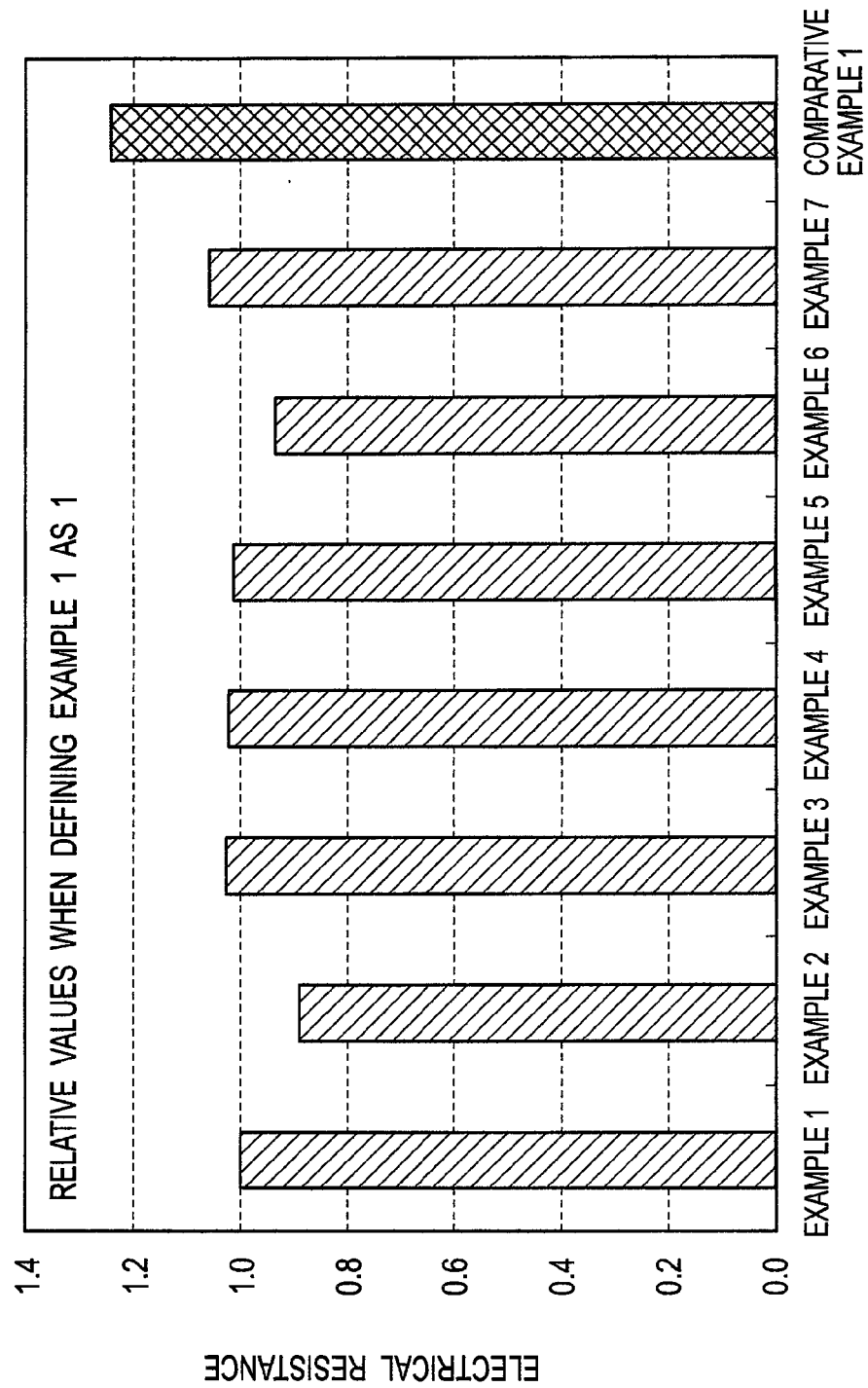
FIG. 12 is a graph showing electrical resistance in a gas diffusion layer obtained in each of Examples and Comparative Example of the present invention.

The electrical resistance of the gas diffusion layer was measured in a manner such that, at the first cycle, the current value was set to 1 A, and the load (surface pressure) between the metal separator and the gold leaf was set to 5 MPa. Subsequently, at the second cycle, the current value was set to 1 A, and the load (surface pressure) between the metal separator and the gold leaf was set to 1 MPa. FIG. 12 shows the comparative results of the electrical resistance at the second cycle in each example. Note that the vertical axis of FIG. 12 indicates normalized values whereby the value of Example 1 has been readjusted to "1".

It is apparent from FIG. 12 that the electrical resistance of the gas diffusion layer in each of Examples 1 to 7 decreases by 20% or more compared with the gas diffusion layer of Comparative Example 1. This may be because the second microporous layer in which the scale-like graphite is concentrated is present on the surface of the gas diffusion layer so that the electrical conductivity in the plane direction of the gas diffusion layer is improved.

[Cell Power Generation Evaluation]

Power generation was evaluated using a small single cell including the membrane electrode assembly obtained in each of Examples 1 to 3, 7, and Comparative Example 1. Here, the active area of the membrane electrode assembly in each of Examples 1 to 3, 7, and Comparative Example 1 has a length of 5 cm and a width of 2 cm. The temperature of hydrogen (H₂) and air as reactant gas was set to 80° C., and the pressure thereof was set to 200 kPa_a.

Figure 13:
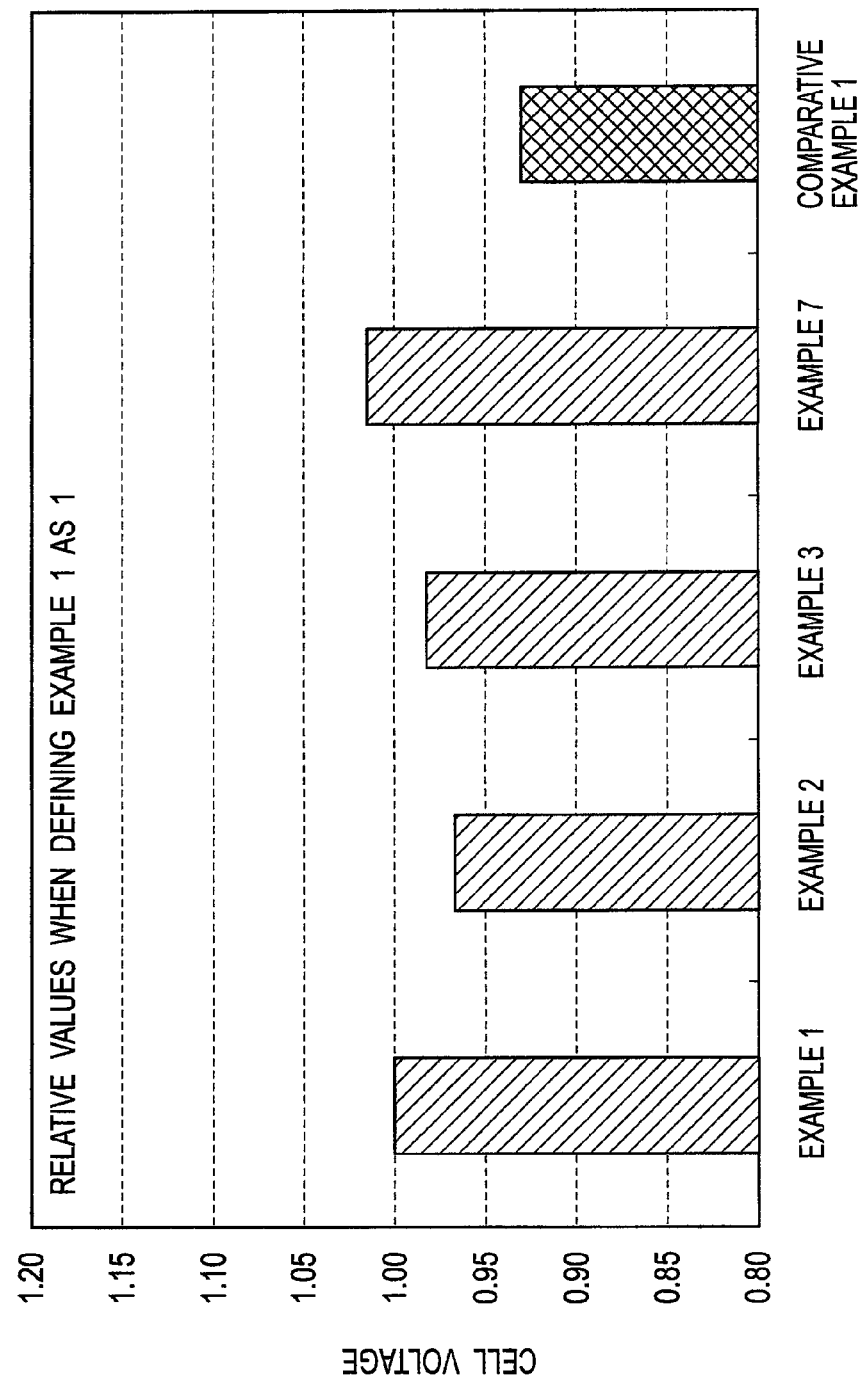
FIG. 13 is a graph showing a power generation performance of a cell obtained in each of Examples and Comparative Example under dry conditions.

The power generation at a current density of 2 A/cm² was evaluated under a dry condition in which relative humidity was set to 30% RH and 20% RH in the anode and the cathode respectively. FIG. 13 shows the evaluation result of the power generation performance under the dry condition. Note that the vertical axis of FIG. 13 indicates normalized values whereby the value of Example 1 has been readjusted to "1".

It is apparent from FIG. 12 that the cell voltage of the membrane electrode assembly in each of Examples 1 to 3 and 7 was improved compared with the membrane electrode assembly of Comparative Example 1. This may be because the second microporous layer in which the scale-like graphite is concentrated is present on the surface of the gas diffusion layer, so as to prevent the water from moving from the electrolyte membrane to the gas diffusion layer substrate to a certain extent. In other words, since dry-out in the electrolyte membrane was prevented due to the concentrated region, a reduction in proton conductivity may be prevented.

[Cell Power Generation Evaluation 2]

Power generation was evaluated using a small single cell including the membrane electrode assembly obtained in each of Examples 1 to 3 and 7. Here, the active area of the membrane electrode assembly in each of Examples 1 to 3 and 7 has a length of 5 cm and a width of 2 cm. The temperature of hydrogen (H₂) and air as reactant gas was set to 80° C., and the pressure thereof was set to 200 kPa_a.

A limiting current density was measured under a wet condition in which relative humidity was set to 90% RH in each of the anode and the cathode. Note that the limiting current density represents a current density at which the voltage reaches or falls below 0.1 V. FIG. 14 shows the result of the limiting current density thus obtained. The vertical axis of FIG. 14 also indicates normalized values whereby the value of Example 1 has been readjusted to "1".

Under the wet condition, the limiting current density in Example 7 slightly decreased compared with the other examples. This may be because the water draining performance decreases since the second microporous layer is thick in Example 7.

The entire contents of Japanese Patent Application No. P2011-135075 (filed on Jun. 17, 2011) and Japanese Patent Application No. P2012-095504 (filed on Apr. 19, 2012) are herein incorporated by reference.

Although the present invention has been described above by reference to the examples, the present invention is not limited to the descriptions thereof, and it will be apparent to those skilled in the art that various modifications and improvements can be made.

INDUSTRIAL APPLICABILITY

According to the present invention, the microporous layer containing the granular carbon material and the scale-like graphite is formed on the gas diffusion layer substrate. In addition, the concentrated region of the scale-like graphite is formed in the microporous layer in a manner as to have a belt-like shape extending in the direction approximately parallel to the junction surface between the microporous layer and the gas diffusion layer substrate. This can improve the electrical conductivity in the plane direction of the gas diffusion layer and also prevent water from being drained excessively.

REFERENCE SIGNS LIST

1 MEMBRANE ELECTRODE ASSEMBLY (MEA)
10 ELECTROLYTE MEMBRANE
20 CATALYST LAYER
30 GAS DIFFUSION LAYER (GDL)
31 GAS DIFFUSION LAYER SUBSTRATE (GDL SUBSTRATE)
32 MICROPOROUS LAYER (MPL)
32a SCALE-LIKE GRAPHITE CONCENTRATED REGION
33 FIRST MICROPOROUS LAYER (MPL)
34 SECOND MICROPOROUS LAYER (MPL)
Gf SCALE-LIKE GRAPHITE
Gfs SMALL-DIAMETER SCALE-LIKE GRAPHITE
Gg GRANULAR GRAPHITE
C CARBON BLACK

The invention claimed is:

1. A gas diffusion layer for a fuel cell, comprising:
a gas diffusion layer substrate that is formed of a carbon paper impregnated with polytetrafluoroethylene; and
a microporous layer that includes a first microporous layer containing a granular carbon material and a second microporous layer containing scaly graphite, the microporous layer being formed on the gas diffusion layer substrate, wherein
the first microporous layer does not contain scaly graphite,
the second microporous layer is formed into a belt-like shape extending in a direction approximately parallel to a junction surface between the microporous layer and the gas diffusion layer substrate, and
a thickness of the first microporous layer is in a range from 10 µm to 100 µm.

2. The gas diffusion layer for a fuel cell according to claim 1, wherein
a surface of the microporous layer opposite to the junction surface is in contact with a catalyst layer of a membrane electrode assembly, and
the first microporous layer is located towards the gas diffusion layer substrate, and the second microporous layer is located towards the catalyst layer from the first microporous layer.

3. The gas diffusion layer for a fuel cell according to claim 1, wherein a thickness of the second microporous layer is less than or equal to 10 µm.

4. The gas diffusion layer for a fuel cell according to claim 1, wherein the second microporous layer contains a binder, the scaly graphite, and at least one of carbon black and granular graphite.

5. The gas diffusion layer for a fuel cell according to claim 4, wherein the scaly graphite includes large-diameter scaly graphite having a mean planar diameter in a range from 5 µm to 50 µm and small-diameter scaly graphite having a mean planar diameter of less than 5 µm.

6. A membrane electrode assembly for a fuel cell, comprising the gas diffusion layer for a fuel cell according to claim 1, the gas diffusion layer being stacked on each surface of an electrolyte membrane via a catalyst layer.

7. A membrane electrode assembly for a fuel cell, comprising:
an anode having a first catalyst layer;
a cathode having a second catalyst layer;
an electrolyte membrane interposed between the anode and the cathode; and
the gas diffusion layer for a fuel cell according to claim 1, wherein the gas diffusion layer is stacked on one surface of the first catalyst layer and one surface of the second catalyst layer.

* * * * *